United States Patent [19]

Stansfield et al.

[11] Patent Number: 5,140,314

[45] Date of Patent: Aug. 18, 1992

[54] IMAGE ASSEMBLY

[75] Inventors: Peter W. Stansfield, Hatfield; Martin Rosen, Barnet, both of England

[73] Assignee: Crosfield Electronics Ltd., England

[21] Appl. No.: 310,576

[22] Filed: Feb. 15, 1989

[30] Foreign Application Priority Data

Feb. 22, 1988 [GB] United Kingdom ............... 8804023

[51] Int. Cl.$^5$ .............................................. G09G 1/06
[52] U.S. Cl. .................................... 340/723; 340/703
[58] Field of Search ............................ 358/22; 382/32; 364/518, 521; 340/703, 724, 723, 721

[56] References Cited

U.S. PATENT DOCUMENTS

| | | | |
|---|---|---|---|
| 4,257,044 | 3/1981 | Fukuoka | 340/723 |
| 4,484,187 | 11/1984 | Brown et al. | 340/724 |
| 4,580,134 | 4/1986 | Campbell et al. | 340/703 |
| 4,688,032 | 8/1987 | Saito et al. | 340/703 |
| 4,789,855 | 12/1988 | Ozeki | 340/724 |
| 4,868,884 | 9/1989 | Miyagaki et al. | 382/32 |
| 4,878,178 | 10/1989 | Takakura et al. | 340/703 |
| 4,924,388 | 5/1990 | Stansfield et al. | 364/518 |

FOREIGN PATENT DOCUMENTS

| | | |
|---|---|---|
| 0184547 | 6/1986 | European Pat. Off. |
| 0245504 | 11/1987 | European Pat. Off. |
| 0278175 | 8/1988 | European Pat. Off. |
| 1551229 | 4/1975 | United Kingdom |

Primary Examiner—Ulysses Weldon
Assistant Examiner—Xiao Min Wu
Attorney, Agent, or Firm—Sughrue, Mion, Zinn, Macpeak & Seas

[57] ABSTRACT

Apparatus for assembling images together in which each image is defined by respective pluralities of sets of data values, each set corresponding to a group of pixels of the image, the groups being arranged in a regular array across the image whereby the sets of data values can be obtained from sets of first data each defining the color content of an image pixel in the group. The apparatus comprises a control system for determining the position of a first image relative to a second image in a desired assembled image; an assembled image store; and a modified image store. The control system is operable to convert the sets of data values of the overlapping groups of pixels defining a region of the assembled images which overlaps and which is to be retouched into the corresponding sets of first data, consolidating the converted sets of first data into an assembled set of data, modifying the assembled set of data as desired, and storing the modified, assembled data set in the modified image store. The control system also assembles the two images together and stores the assembled images in the assembled image store, regions of the assembled image corresponding to previously modified regions being defined by the respective stored, assembled data set in the modified image store.

4 Claims, 3 Drawing Sheets

IMAGE ASSEMBLY

FIELD OF THE INVENTION

The invention relates to methods and apparatus for assembling images together.

DESCRIPTION OF THE PRIOR ART

Conventional, high resolution image scanning techniques lead to the generation of digital representations of images having very large amounts of data. Typically, a coloured image is represented by three or four colour components, for example, cyan, magenta, yellow, and black, the colour density of each colour component being defined by an N bit digital value, where N is typically 8. It will be appreciated that at pixel densities in the order of 300 pixels/inch × 300 pixels/inch a considerable amount of data is generated.

In order to reduce the amount of data for the purposes of storage or transmission, it is becoming the practice to compress the data using various compression techniques. One useful technique is to divide the image into groups of pixels. typically a regular, orthogonal array. Each group of pixels is then processed to reduce the data needed to define the colour information. One form of data compression is to transform the spatial, pixel data into the frequency domain leading to the generation of a number of DC components and a larger number of AC components, the total amount of DC and AC data being much less than the total number of data values originally required to define the group of pixels in the spatial domain.

One common form of image manipulation technique is the assembly of two or more images together into a composite image. Conventionally, where the images are in a compressed form, this has been achieved by decompressing the compressed versions of the images and then overlaying the decompressed versions at their relative positions, the "upper" image being dominant in regions of overlap. In other words, where there is overlap between the regions, the pixel data of the assembled image will be that of the upper image and the corresponding pixel data of the lower image will be discarded. More complex forms of combination can also be achieved.

The decompression of images into the spatial domain and the subsequent manipulation of those images in the spatial domain is a numerically intense task and hence time consuming. One proposal for reducing the time involved in assembling compressed images is described in EP-A-0278175.

This recently proposed technique is useful in enabling compressed images to be combined without first completely decompressing the images into the spatial domain but a further requirement which is sometimes required is to be able to retouch or otherwise manipulate the assembled image. In the past, this has required the decompression of the assembled image into the spatial domain and again is a time consuming process.

SUMMARY OF THE INVENTION

In accordance with one aspect of the present invention, a method of assembling images together in which each image is defined by respective pluralities of sets of data values, each set corresponding to a group of pixels of the image, the groups being arranged in a regular array across the image whereby the sets of data values can be obtained from sets of first data each defining the colour content of an image pixel in the group comprises determining the position of a first image relative to a second image in a desired assembled image; retouching at least one region of the assembled image prior to the assembly step, the region including overlapping portions of said pixel groups of the first and second images, the retouching step comprising converting the sets of data values of the overlapping groups into the corresponding sets of first data, consolidating the converted sets of first data into an assembled set of data, modifying the assembled set of data as desired, and storing the modified, assembled data set; and then assembling the two images together, regions of the assembled image corresponding to previously modified regions being defined by the respective stored, assembled data set.

In accordance with a second aspect of the present invention, apparatus for assembling images together in which each image is defined by respective pluralities of sets of data values, each set corresponding to a group of pixels of the image, the groups being arranged in a regular array across the image whereby the sets of data values can be obtained from sets of first data each defining the colour content of an image pixel in the group, comprises control means for determining the position of a first image relative to a second image in a desired assembled image; an assembled image store; and a modified image store, the control means being operable to convert the sets of data values of the overlapping groups of pixels defining a region of the assembled images which overlaps and which is to be retouched into the corresponding sets of first data, consolidating the converted sets of first data into an assembled set of data, modifying the assembled set of data as desired, and storing the modified, assembled data set in the modified image store, and the control means also assembling the two images together and storing the assembled images in the assembled image store, regions of the assembled image corresponding to previously modified regions being defined by the respective stored, assembled data set in the modified image store.

With this invention, regions of the assembled image which are to be retouched are retouched or modified before the complete assembled image is generated. Thus, only those parts o+the assembled image which are to be retouched need to be converted into the spatial domain while the bulk of the remaining assembled image can be let in the compressed form until final assembly is required. The final assembly process itself will typically comprise the steps of converting the remaining sets of data values to the corresponding first data and then combining the images in a conventional manner.

Typically, the method will be performed on a conventional image retouching system such as our Studio system, the retouching step being carried out by an operator who views the images to be assembled on a monitor screen.

BRIEF DESCRIPTION OF THE DRAWINGS

An example of apparatus for assembling images using a method in accordance with the present invention will now be described with reference to the accompanying drawings, in which.

DETAILED DESCRIPTION OF AN EMBODIMENT

Figure 1:
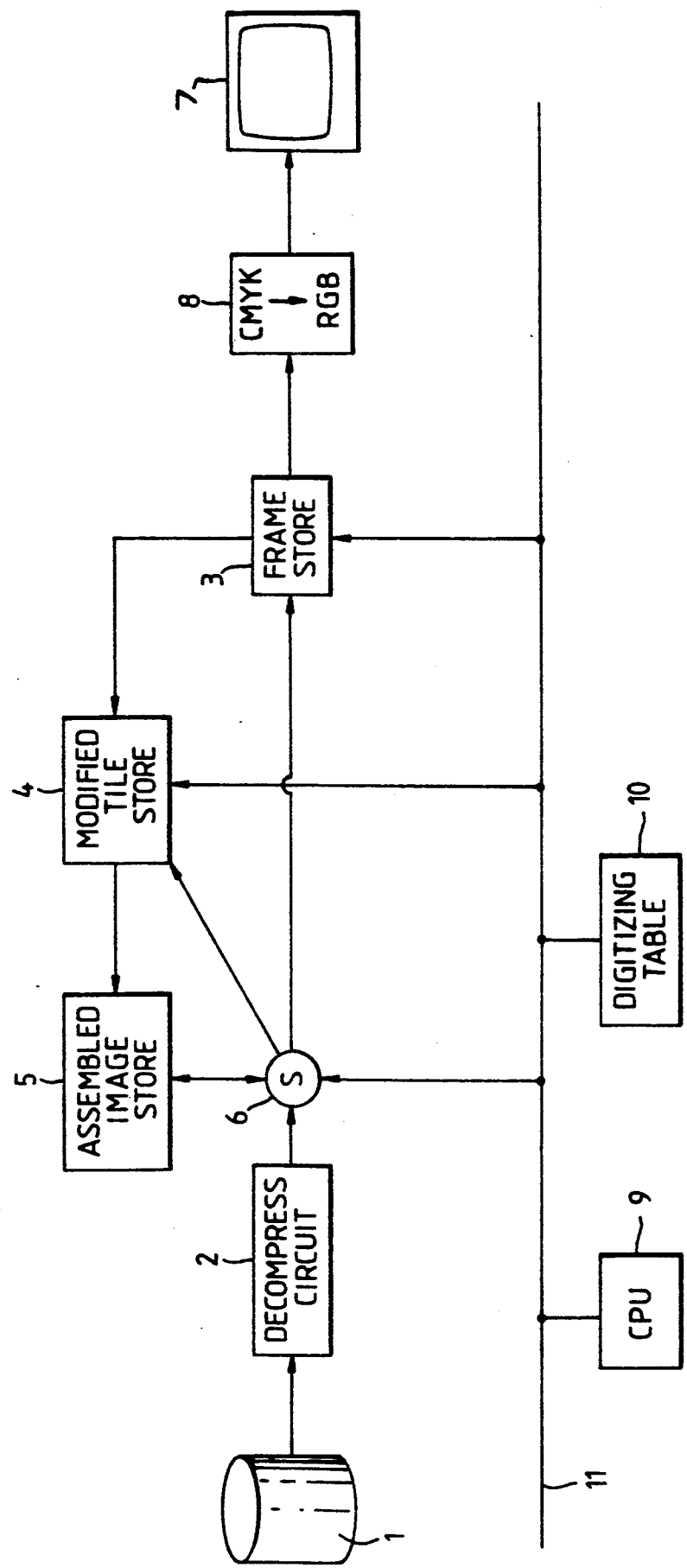
FIG. 1 is a block diagram of the apparatus.

The apparatus shown in FIG. 1 comprises a disc store 1 which stores a number of images each defined by compressed data. This compressed data may have been generated by initially scanning original pictures to generate 8 bit digital values, each representing respective ones of the cyan, magenta, yellow and black colour components of each pixel in the original image; dividing that representation of the image into tiles or blocks of pixels (typically 8×8 tiles); and for each tile transforming the spatial information defining the pixel data into the frequency domain and storing the coefficients of the frequency components. This is described in more detail in our copending European application mentioned above.

The disc store 1 is connected to a decompression circuit 2 which converts each tile of compressed data into the spatial domain by reversing the compression steps previously carried out.

The decompressed data is fed either to a frame store 3, or to a modified tile store 4, or to an assembled image store 5 as will be described in more detail below. Although this will typically be achieved by suitably addressing the data to one of these stores each of which will be connected by a common data bus, it has been shown more simply in FIG. 1 by the use of a switch 6.

Data loaded in the frame store 3 will define the content of each pixel of the selected part of an image in terms of its cyan, magenta, yellow and black colour components. To enable the pixel colour to be displayed on a monitor 7, the colour component data is fed to a conventional colour converter 8 which converts the four colour components to values representing red, green, and blue which are used to control the monitor display. The apparatus is controlled by a microprocessor 9 and an operator actuable digitising table 10 connected to a common bus 11.

Figure 2:
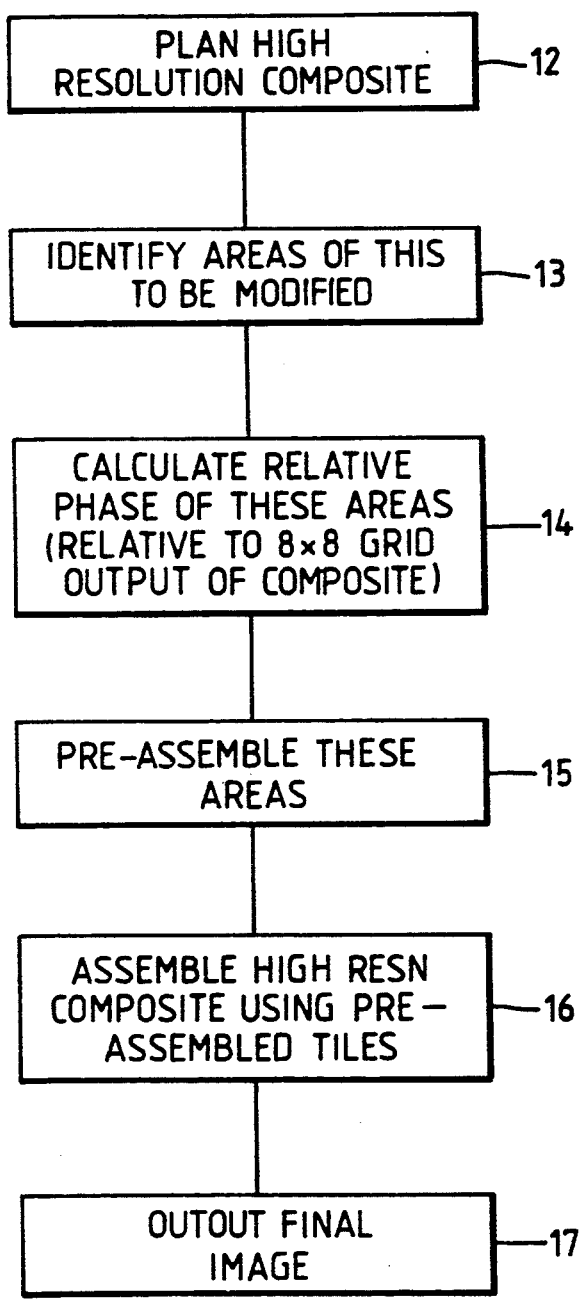
FIG. 2 is a schematic flow diagram illustrating operation of the apparatus; and, FIG. 3 illustrates two tiles to be assembled.

In use, the operator first selects from the disc store 1 those images which he wishes to assemble into a composite image or page. This is achieved in a step 12 (FIG. 2) in a conventional manner by passing low resolution versions of these images via the decompression circuit 2 and a switch 6 to the frame store 3. The low resolution versions are then manipulated using the digitising table 10 to determine their final relative positions which can be viewed on the monitor 7. In addition, the operator may decide to modify or retouch certain areas of the final composite image. As mentioned above, in the past, this could only be achieved after first assembling the final composite image by decompressing the full images on the disc store 1 and assembling them in the image store 5 at the decompressed, high resolution.

Figure 3:
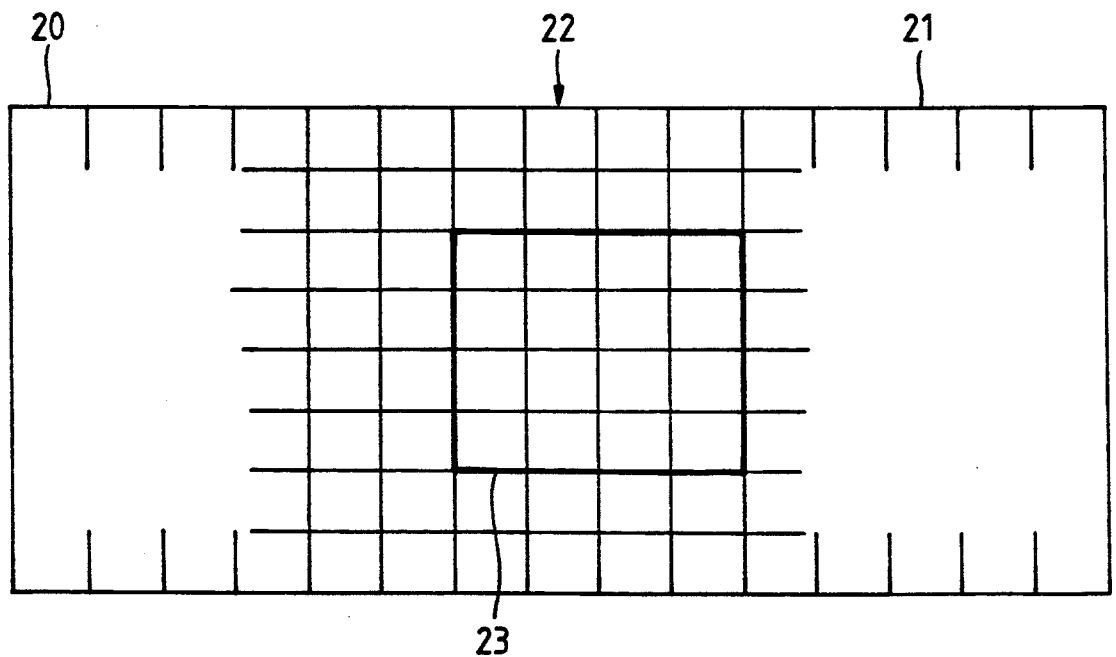

Instead, once the areas to be modified have been identified (step 13) the relative offset between the tile arrays of the overlapping images is calculated (step 14) by the microprocessor 9 and the tiles falling within the area or region to be modified are located. For example, FIG. 3 illustrates two 8×8 tiles 20, 21 of respective images which, in the final image, overlap by one pixel as indicated at 22. The operator wishes to retouch a section including that overlapping region of 4×4 pixels indicated at 23.

The microprocessor 9 then causes all tiles having portions falling within the region 23 to be modified to be down loaded from the disc store 1 and decompressed by the decompression circuit 2. These tiles 20, 21 are then consolidated or assembled in a conventional manner under the control of the microprocessor 9 (step 15) and the assembled version of these tiles is fed to the frame store 3 allowing the assembled version to be displayed on the monitor 7. The operator then modifies this assembled region in a conventional manner by using the digitising table 10 to modify the colour content of the frame store 3. Once a finally desired form for this region has been achieved, the relevant colour content of the frame store 3 is stored in the modified tile store 4.

Once all areas to be retouched or modified have been retouched and stored in the modified tile store 4, the microprocessor 9 causes the full image to be assembled. This is achieved by decompressing the remaining, unmodified tiles of each image as stored on the disc store 1 and storing those decompressed tiles, after assembly, in the assembled image store 5. Where a region of the assembled image corresponds to a region stored in the store 4 which has been retouched, such as the region shown in FIG. 3 the assembled image store 5 is caused to receive instead the corresponding modified data from the modified tile store 4 (step 16).

Finally, the assembled image in the store 5 can be fed to the frame store 3 and displayed on the monitor 7 to check that the final assembly is correct (step 17).

We claim:

1. A method of assembling images together in which each image is defined by respective pluralities of sets of data values defining an image at a low resolution, each set corresponding to a group of pixels of the image, the groups being arranged in a regular array across the image whereby the sets of data values can be obtained from sets of first data at a higher resolution each defining the colour content of an image pixel in the group, the method comprising determining the position of a first image relative to a second image in a desired assembled image; retouching at least one region of the assembled image prior to the assembly step, the region including overlapping portions of said pixel groups of the first and second images, the retouching step comprising converting the sets of data values of the overlapping groups at the low resolution into the corresponding sets of the first data at the higher resolution, consolidating the converted sets of first data into an assembled set of data at the higher resolution, modifying the assembled set of data as desired, and storing the modified, assembled data set at the higher resolution; and then assembling the two images together at the higher resolution, regions of the assembled image corresponding to previously modified regions being defined by the respective stored, assembled data set.

2. A method according to claim 1, wherein the step of assembling the two images together comprises the steps of converting the remaining sets of data values to the corresponding first data and then combining the images.

3. Apparatus for assembling images together in which each image is defined by respective pluralities of sets of data values defining an image at a low resolution, each set corresponding to a group of pixels of the image, the groups being arranged in a regular array across the image whereby the sets of data values can be obtained from sets of first data at a higher resolution each defining the colour content of an image pixel in the group, the apparatus comprising control means for determining the position of a first image relative to a second image in a desired assembled image; an assembled image store; and a modified image store, the control means being operable to convert the sets of data values of the overlapping groups of pixels at the low resolution defining a region of the assembled images which overlaps and which is to be retouched into the corresponding sets of first data at the higher resolution, consolidating the converted sets of first data into an assembled set of data at the higher resolution, modifying the assembled set of data as desired, and storing the modified, assembled data set in the modified image store, and the control means also assembling the two images together at the higher resolution and storing the assembled images in the assembled image store, regions of the assembled image corresponding to previously modified regions being defined by the respective stored, assembled data set in the modified image store.

4. Apparatus according to claim 3, further comprising a monitor and a frame store, the control means being adapted to store the converted sets of data values in the frame store to enable them to be viewed on the monitor.

* * * * *